Nov. 24, 1959 W. GRYCKO 2,913,940
ANTI-SKID CHAIN MOUNTING DEVICES FOR TIRES
Filed Dec. 20, 1957
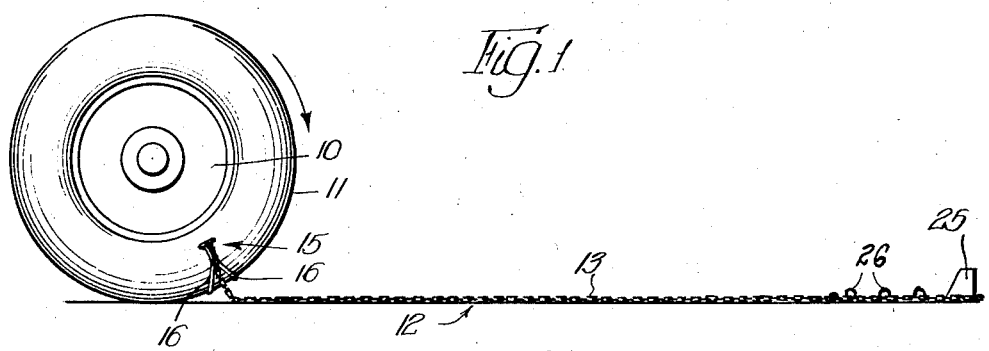
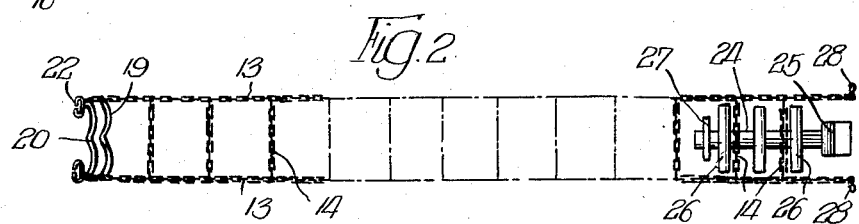
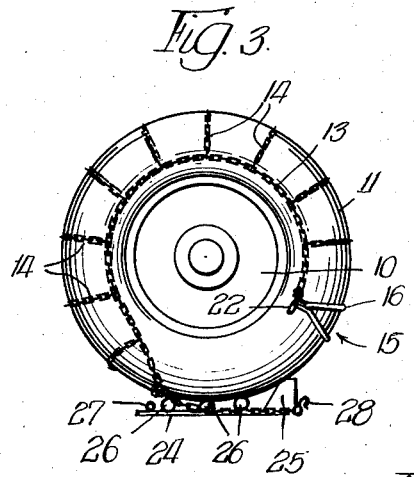
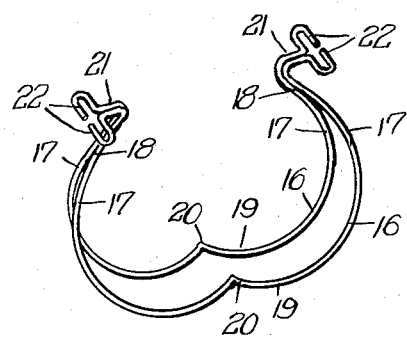
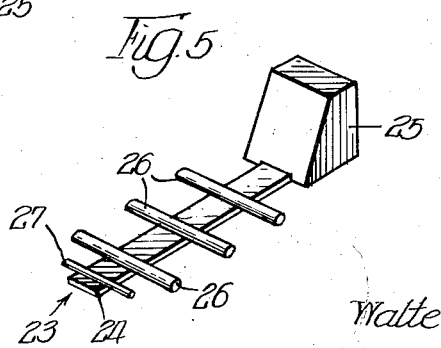
INVENTOR.
Walter Grycko,
BY United States Patent Office 2,913,940
Patented Nov. 24, 1959

2,913,940
ANTI-SKID CHAIN MOUNTING DEVICES FOR TIRES

Walter Grycko, Miami, Fla.

Application December 20, 1957, Serial No. 704,080

2 Claims. (Cl. 81—15.8)

The present invention relates to anti-skid chain mounting devices for vehicle tires, and has for its main object the provision of a clamping member attachable to a tire in a transverse relation therewith, for engaging one end of an anti-skid chain when the latter is laid upon the ground in a horizontal position preparatory to the backing up of the vehicle wheel for the purpose of mounting the chain upon the tire in an encompassing relation therewith.

A still further object of the present invention is the provision of a suitable ramp upon which the opposite end of the chain is supported for facilitating lifting of that end of the chain and engaging the same with the end of the chain which theretofore was engaged by said clamping member.

Another object of the present invention is the provision of a clamping member aforesaid for engaging one end of the anti-skid chain preparatory to mounting of the latter upon the tire in an encompassing relation therewith, which clamping member may be made of a pair of wire strands, engageable with the tire in a substantially transverse relation therewith, and wherein each strand may remain substantially in a radial relation with the wheel so as to prevent the disengagement of the clamping member from the tire when the weight pressure is applied by the tire to one of said wire strands during the rotation of the wheel in the process of mounting the chain around the tire.

With the above general objects in view and others that will appear as the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views:

Fig. 1 is a side elevational view of a vehicle wheel, including the tire thereof, with the clamping member in an engaged position with the tire, further illustrating the initial position of an anti-skid chain laid horizontally upon the ground and in the track of the wheel and rearwardly of the vehicle, preparatory to the threading of the chain around the tire when the wheel is caused to turn in a rearward direction and upon the chain, with one end of the chain engaged with said clamping member and the opposite end of the chain laid upon a suitable ramp permitting lifting of that latter end of the chain when the wheel has been backed up with the tire thereof supported upon the ramp;

Fig. 2 is a top plan view of the anti-skid chain laid out horizontally in the track of the tire, with one end of the chain in engagement with the clamping member and the opposite end thereof supported upon the ramp, preparatory to the threading operation of the chain around the tire when the vehicle wheel is shifted to a rearward direction;

Fig. 3 is a side elevational view of the wheel and the tire thereof, with the threading of the anti-skid chain around the tire almost completed, with the tire resting upon and supported by the ramp, preparatory to the lifting of the end of the chain supported upon the ramp and engaging the same with the opposite end thereof, preparatory to the disengagement of the clamping member from that latter end of the chain;

Fig. 4 is an enlarged perspective view of the clamping member whereby one end of an anti-skid chain is engaged with the tire during the threading operation of the anti-skid chain therearound; and Fig. 5 is a perspective view of the ramp capable of supporting one end of the anti-skid chain and from which the latter may be lifted when the threading operation of the anti-skid chain around the tire has been completed and when the tire has been brought in a supported relation with said ramp.

Referring to the present drawing in detail there is shown therein a vehicle wheel 10 having a tire 11 therearound. The anti-skid chain, generally indicated by 12 in Fig. 1, includes a pair of oblong side members 13, and a plurality of transversely connecting anti-skid ribs 14. Preparatory to the mounting or threading of the anti-skid chain 12 around tire 11, the ends of the chain side members 13 are engaged with a clamping member, generally indicated by 15 in Figs. 1 and 3, and shown in detail in Fig. 4. Said clamping member includes a pair of wire strands 16 which generally are of arcuate formation, substantially corresponding to the transverse arc of the tire. Each of said wire strands 16 is substantially of a U-shaped formation and is of inherently resilient nature. Each of said wire strands 16 includes a pair of opposed side portions 17. The adjacent two side portions 17 at their upper free ends, in the two wire strands 16, are rigidly connected by welds 18 or other suitable means, for maintaining them in a mutual angular position and for maintaining the web portions or bights 19, in the two wire strands 16 in a rigid spaced relation. The opposed pairs of sides 17, including the connected ends thereof, in the two wire strands 16 define a pair of opposed clamping jaws which are converging towards each other for exerting a clamping action upon the sides of tire 11 when said clamping member remains in an operative transversely clamped relation with the tire.

The web portion 19 of each wire strand 16 is provided at its center with an inwardly directed bulge 20. The two bulges 20 in the two wire strands 16 are in alinement in a transverse relation with said webs 19, or in a longitudinal relation with the thread portion of the tire when said clamping member 15 is in an operative position therewith. In the operative position of the clamping member 15 with tire 11, bulges 20 remain in contact with the tire, thereby maintaining webs 19 and the adjacent side portions 17 of the wire strands 16 in a spaced relation with the tire. Due to this construction, when the weight of tire 10 is brought to bear upon said webs 19, or either of them, webs 19, or either of them tend to straighten out, thereby bringing about the distortion of the clamping member, in consequence of which the free welded ends of sides 17, on each side of the clamping member, are urged towards each other, thereby increasing the clamping action of said clamping member 15 upon tire 11. Due to the welded connections 18 in the sides 17, at each end of the pair of wire strands 16, the enhanced clamping action of sides 17 upon the tire takes place notwithstanding the fact that the weight pressure by the tire upon web 19 only in one of said wire strands has taken place. An important advantage in providing a pair of wire strands 16, in preference to the clamping member made of one solid piece, resides in the fact that the rotating tire causing pressure upon one of said strands 19 and contacting the same with the ground, will prevent the clamping member from shifting lengthwise of the tire, thereby preventing dislodgement thereof from the tire, which would ensue were the clamping member made in one piece.

The free ends of each pair of coacting sides 17 are bent away from each other, on horizontal plane, to effect lateral projections 21, each of which terminates in a pair of hooks 22 directed towards each other. A pair of the opposed hooks 22 in two projections 21 are adapted to engage the end links of sides 13 of the anti-skid chain 12, when said clamping member 15 remains in an operative engaged position with tire 11. As seen in Fig. 4, there are two pairs of opposed hooks 22 for the purpose of selectively engaging the end links of the sides 13 of the anti-skid chain 12, by virtue of which arrangement the clamping member 15 may be applied to the tire to engage chain 12 in conformity with the direction of rotation of wheel 10 so that chain 12 would not disconnect from said clamping member 15 during the process of threading the anti-skid chain around the tire.

As a preliminary step to the chain mounting operation, first clamping member 15 is applied to tire 11, as is seen in Fig. 1. Then, chain 12 is laid upon the ground, in a spread position, and in the track of tire 11, and rearwardly thereof, as is seen in Figs. 1 and 2. Thereupon, the end links of the side members 13, of chain 12, which are proximate to tire 11, are engaged with a pair of hooks 22 which are proximate to that end of chain 12. The opposite end of chain 12 is laid upon ramp, generally indicated by 23 in Fig. 5.

Said ramp 23 includes an oblong base 24, with one end of which stop member 25 rigidly connects, and from which the same projects in an upward direction. In the operative position of said ramp 23 with relation to the spread out chain 12, as seen in Fig. 1, said stop 25 is at the end of said base 24 which is farther removed from tire 11.

Rigidly affixed at the upper face of said base 24, in a transverse relation therewith, is a plurality of rungs 26. There are three such rungs shown in the drawing. In the operative position of the anti-skid chain 12 each of the two end anti-skid ribs 14, at the adjacent end of said anti-skid chain 12, is receivable within a pair of the adjacent rungs 26, as is seen in Fig. 2. In that operative preliminary position of the chain preparatory to mounting thereof upon tire 11, said end anti-skid ribs 14 contact with said base 24, by their center portions, while the adjacent ends of side members 13 are disposed laterally of the ends of said rungs 26 and in a contactual relation with the ground. The diameter of said rungs 26 is larger than the thickness of the links in the anti-skid ribs 14, so that when the tire reposes upon said ramp 23 the body of the tire does not press said anti-skid ribs 14 against said base 24. Neither does the tire contact the adjacent ends of the chain side members 13. By virtue of this arrangement the end of chain 12, disposed upon or adjacent to said ramp 23 is freely liftable toward and against the tire in order to encompass said end around the tire and to complete the mounting of the chain around the tire.

Tire 11 coming upon said ramp 23 when the vehicle is backed up in order to thread the anti-skid chain therearound comes in contact with said stop 25, as is seen in Fig. 3, whereby a further rearward motion of the vehicle wheel is stopped.

At its free, proximate end, said base 24 has an end rung 27 rigidly affixed thereto at the upper face of the former. The diameter of said rung 27 is smaller than the diameter of rungs 26, for the purpose of providing a gradual slope for said ramp 23 at the adjacent end thereof, for the purpose of easing tire 11 and elevating the same to and upon said rungs 26 during the rearward motion of tire 11. At the completion of the threading operation of the anti-skid chain around the tire, the latter rests upon said rungs 26 or upon some of them, without contacting the anti-skid ribs 14.

By virtue of the last hereinabove mentioned condition the end of the anti-skid chain 12, being quite free from the pressure of the tire, may be lifted to complete the chain threading operation around the tire. When the chain has been brought around the tire to the position shown in Fig. 3, the ends of the side members 13 are disengaged from hooks 22 and the clamping member 15 is thereupon removed from tire 11. Thereupon the opposite end of the chain is lifted from ramp 23 and the adjacent ends of chain 12 are then connected with the ends which were theretofore in engagement with said hooks 22. Thereupon, by means of buckle 28 or similar fastening means the ends of each side member 13 are connected in the usual manner. Thereupon tire 11 is driven off from ramp 23, freeing the latter, and thereupon the same may be moved into the vehicle.

As is seen in Fig. 1 when the vehicle is backed up, causing the rotation of tire 11 in the direction indicated by an arrow in Fig. 1, for causing the rotary shifting movement of the tire along the track defined by the laid and stretched out chain 12, the clamping member 15 is applied to tire 11 at a point which is proximate to said track. Thereupon, when the tire is caused to move to a rearward direction, said clamping member 15 will be caused to shift with the tire, with the leading wire strand 16 hitting the ground, and at which the maximum weight pressure will be applied when said leading wire strand 16 passes the point of contact between the tire and the ground. Thereupon both wire strands 16 will undergo in equal measure the weight pressure by the tire against the ground as the tire rotates in the rearward direction. Finally, the rearward wire strand 16 will bear the greatest pressure by the tire against the ground as the tire continues rotation in the rearward direction. Due to the changes of pressure by the tire against the ground, first upon one, and then upon the other of said wire strands 16, or equally against both of them, depending upon the particular relative position of the tire as the same rotates, and with relation to the contact point between the tire and the ground, it is of utmost importance that the clamping member should be so constructed as to withstand the various changes of pressure exerted thereon by the tire as the clamping member passes the contact point between the tire and the ground, for preventing the dislodgement of the clamping member from the tire as the latter presses the clamping member against the ground, but not in an equal degree against all points at the web portion thereof. A clamping member made of a single piece would not prevent the dislodgement of a clamping member from the tire, because in such a clamping member there would be no equalization or proper distribution of the degrees of pressure exerted by the tire as the latter causes the clamping member to shift past the contact point therebetween and the ground. When however the clamping member is made of a pair of wire strands, such as wire strands 16, there is proper equalization or distribution of the various degrees of the pressure imparted to one or the other of said strand members 16, for guarding against the dislodgement of the clamping member from the tire or the shifting thereof in a longitudinal relation with the tire. This effect will be had notwithstanding the fact that the sides 17 of each pair of wire strands 16 are rigidly interconnected through welds 18.

While there are described herein preferred embodiments of the present invention, it is nevertheless to be understood that minor changes may be made therein without departing from the spirit and scope of the invention as claimed.

What I claim as new is:

1. A clamp of the type described comprising a pair of identically formed, substantially U-shaped resilient wire members, said wire members including bight portions in a mutually spaced relation, the adjacent ends of the pair of said wire members being in planes which are angularly related to each other and being rigidly interconnected to define a pair of opposed clamping jaws, said clamping jaws being convergent towards each other, hooks formed at the free ends of said jaws in a mutually divergent direction, and inwardly directed bulges extending from the center of the bight portions of said wire members.

2. A clamp of the type described comprising a pair of identically formed, substantially U-shaped resilient wire members, said wire members including bight portions in a mutually spaced relation, the adjacent ends of the pair of said wire members being in planes which are angularly related to each other and being rigidly interconnected to define a pair of opposed clamping jaws, said clamping jaws being convergent towards each other, a hook formed at the free end of each of said jaws, and inwardly directed bulges extending substantially from the center of the bight portions of said wire members.

References Cited in the file of this patent

UNITED STATES PATENTS

| | | |
|---|---|---|
| 1,099,034 | Girard | June 2, 1914 |
| 2,159,626 | Boycutt | May 23, 1939 |
| 2,166,869 | Lees et al. | July 18, 1939 |
| 2,175,395 | Hewel | Oct. 10, 1939 |
| 2,279,108 | Clifford | Apr. 7, 1942 |
| 2,299,185 | Smola | Oct. 20, 1942 |
| 2,604,802 | Rhoads et al. | July 29, 1952 |
| 2,731,059 | Ford | Jan. 17, 1956 |
| 2,857,136 | Thomas | Oct. 21, 1958 |